(12) United States Patent
Miura et al.

(10) Patent No.: US 6,218,758 B1
(45) Date of Patent: *Apr. 17, 2001

(54) STATOR OF DYNAMO-ELECTRIC MACHINE

(75) Inventors: Tetsuya Miura; Yasutomo Kwabata; Ryoji Mizutani; Tetsuya Sugimoto, all of Aichi-ken (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,380

(22) Filed: Jul. 7, 1998

(30) Foreign Application Priority Data

Jul. 10, 1997 (JP) .................................. 9-185371

(51) Int. Cl.⁷ .............................. H02K 3/04; H02K 1/12
(52) U.S. Cl. ........................................ 310/254; 310/208
(58) Field of Search ......................... 310/254, 208, 310/179, 180, 184, 198

(56) References Cited

U.S. PATENT DOCUMENTS

| | | | |
|---|---|---|---|
| 4,296,344 | * 10/1981 | Rabe .................................... | 310/184 |
| 5,015,903 | * 5/1991 | Hancock et al. ..................... | 310/168 |
| 5,218,253 | * 6/1993 | Morehouse et al. ................ | 310/68 R |
| 5,243,248 | * 9/1993 | Benford et al. ..................... | 310/256 |
| 5,304,882 | * 4/1994 | Lipo et al. ........................... | 310/156 |
| 5,642,013 | * 6/1997 | Wavre .................................. | 310/254 |
| 5,663,605 | * 9/1997 | Evans et al. ........................ | 310/181 |
| 5,698,917 | * 12/1997 | Shultz ................................... | 310/87 |
| 5,708,316 | * 1/1998 | Ishida ................................... | 310/184 |
| 5,744,888 | * 4/1998 | Zajc et al. ........................... | 310/185 |
| 5,780,949 | * 7/1998 | Li ......................................... | 310/198 |
| 5,866,964 | * 2/1999 | Li ......................................... | 310/198 |
| 5,866,965 | * 2/1999 | Baronosky et al. ................. | 310/208 |
| 5,910,691 | * 6/1999 | Wavre .................................. | 310/12 |
| 5,923,142 | * 7/1999 | Li ......................................... | 318/701 |
| 5,955,807 | * 9/1999 | Kajiura et al. ...................... | 310/156 |
| 6,011,339 | * 1/2000 | Kawakami ........................... | 310/208 |
| 6,087,755 | * 7/2000 | Suzuki et al. ....................... | 310/254 |

FOREIGN PATENT DOCUMENTS

| | | |
|---|---|---|
| 08205434 | 8/1996 | (JP) . |
| 2524074 | 11/1998 | (JP) . |

* cited by examiner

*Primary Examiner*—Nestor Ramirez
*Assistant Examiner*—Guillermo Perez
(74) *Attorney, Agent, or Firm*—Oblon, Spivak, McClelland, Maier & Neustadt, P.C.

(57) ABSTRACT

A stator of a dynamo-electric machine which is capable of raising the space factor in each slot and which can easily be assembled incorporates first coil pieces, each of which has a width at the lower portion of the slot being smaller than the width at the upper portion of two slots; and second coil pieces arranged to be fitted to teeth adjacent to the tooth to which the first coil piece is fitted so as to be inserted into the empty space for filling the space. The first and second coil pieces are alternately inserted into the slots of the stator core. The empty space in the slot formed after the first coil piece has been inserted has sides extending parallel with the adjacent tooth or is gradually widened toward the upper portion of the slot. Therefore, the second coil piece can easily be inserted into the slot without interference with another member. Thus, the slots can be filled with the second coil pieces so that the space factor can be raised.

16 Claims, 7 Drawing Sheets

STATOR OF DYNAMO-ELECTRIC MACHINE

INCORPORATION BY REFERENCE

The disclosure of Japanese Patent Application No. HEI 9-185371 filed on Jul. 10, 1997 including the specification, drawings and abstract is incorporated herein by reference in its entirety.

BACKGROUND OF THE INVENTION

1. Field of the Invention

The present invention relates to an improvement in a stator of a dynamo-electric machine which is assembled by sequentially inserting premolded coil pieces into a stator core.

2. Description of the Related Art

Figure 7:
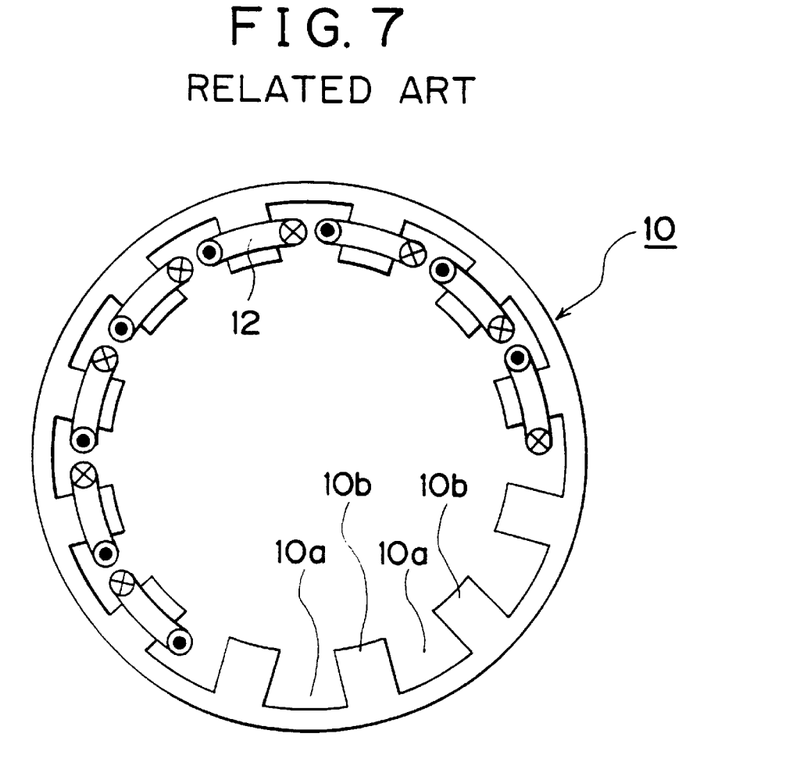
FIG. 7 is a diagram showing the structure of a stator of a general dynamo-electric machine.

In general, a stator of a dynamo-electric machine has a stator core 10 which is, as shown in FIG. 7, constituted by stacking a plurality of annular metal plates each having slots 10a and teeth 10b (a portion interposed between two teeth is called a "slot") alternately formed along the inner periphery thereof. The stator further has coils 12, each of which is formed by continuously winding a coil wire coated with enamel or the like around the tooth 10b of the stator core 10. The stator shown in FIG. 7 is formed by a winding method which is so-called concentrated winding. In this method, one coil 12 is provided for one tooth 10b. One or a plurality of bundled wires each having a diameter ranging from about 0.5 mm to about 1.0 mm are wound around a tooth 10b a predetermined number of times. Therefore, the slot 10a is designed to receive adjacent ends of two coils fitted to two teeth 10b interposing the slot 10a. When an electric current is allowed to pass through each coil 12, a magnetic flux is generated in a direction along which the magnetic flux penetrates the coil 12 through the teeth 10b serving as a magnetic path. As a result, a rotor (not shown) can be rotated. The dynamo-electric machine acts as a dynamo-electric generator by rotating the rotor with the aid of an external force.

Generally it takes a long time to wind the coil wire around each tooth 10b as described above. Additionally it is difficult to automate such winding operation. Japanese Utility-Model Publication No. 2524074 discloses a structure arranged such that coil pieces, which have been molded to have a predetermined shape using a mold or the like, are fitted with the teeth 10b. In this case, the slots 10a accommodate the coil pieces, each of which is formed by winding a coil wire predetermined number of times across the teeth 10b. Therefore, the operation for assembling the stator can easily be completed. Moreover, the operation for winding the coil wire can easily be automated.

When the slots 10a for accommodating the coil pieces are formed along the inner periphery of the stator core 10 as shown in FIG. 7, the width of the open portion (the upper portion) of each slot 10a is smaller than that of the bottom portion (the lower portion) of the slot 10a. That is, the slot 10a has a shape which is gradually widened toward the bottom portion thereof. Therefore, the cross sectional width of the coil piece which is inserted into the slot 10a must be equal to or smaller than the width of the open portion of the slot 10a so as to prevent interference with a leading end of the tooth 10b. As a result, there is undesirable space formed within the slot 10a after inserting the coil piece having the above described shape into the slot 10a. Thus, the required space factor in the slot 10a cannot be obtained, resulting in problems such as deteriorated performance of the dynamo-electric machine.

Figure 8:
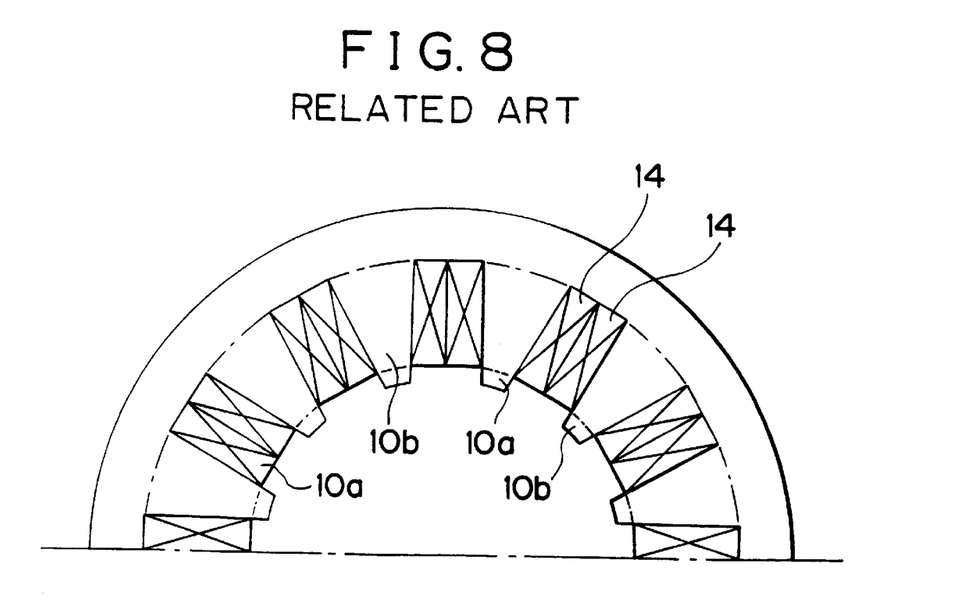
FIG. 8 is a diagram showing the structure of another type of a stator of the conventional dynamo-electric machine.

It might be considered feasible to form each of the teeth 10b into a trapezoidal shape so as to form the slot 10a into a rectangular shape, as shown in FIG. 8. In this case, the coil pieces 14 must be gradually widened so as to be fitted with the trapezoidal teeth 10b. However, the coil pieces 14, each of which is formed by winding the coil wire a plural number of times, are too rigid to be widened as described above. Thus, there arises a problem in that fitting operation while widening the coil pieces is very difficult.

Another method has been suggested which has the steps of fitting the coil pieces 14 with sectioned portions of the stator core 10, and combining the sectioned portions of the stator core 10 with one another by welding or the like. Using the above-mentioned method, however, may deteriorate rigidity of the stator itself and fail to keep the accuracy of the shape to a predetermined level or more. This may result in deterioration of the dynamo-electric machine.

SUMMARY OF THE INVENTION

In view of the foregoing, an object of the present invention is to provide a stator of a dynamo-electric machine which is capable of raising the space factor in slots thereof and which can easily be assembled.

To achieve the above-mentioned object, according to one aspect of the present invention, there is provided a stator of a dynamo-electric machine formed of an annular stator core having a plurality of slots and teeth alternately formed along the inner periphery thereof and a plurality of coil pieces which can sequentially be inserted into the slots across the teeth. The coil pieces include first coil pieces, each having a cross sectional shape arranged such that the width of the coil at the lower portion of the slot is equal to or smaller than the width of the inner periphery of two adjacent slots. One side of the coil piece facing a tooth adjacent to the tooth fitted with the coil piece extends substantially parallel with the side of the adjacent tooth or is located such that the width of the upper portion of the slot is gradually increased from the lower portion. The coil pieces further include second coil pieces, each of which is fitted to a tooth adjacent to the tooth to which the first coil piece is fitted so as to be inserted into an empty space in the slot formed after the first coil piece has been inserted for filling the empty space.

The lower portion of the slot refers to a bottom portion thereof located along the outer periphery of the stator core, while the upper portion of the slot refers to an open portion thereof located close to the center of the stator core.

According to the above-mentioned structure, the empty space in the slot which is formed after the first coil piece has been inserted is located parallel with the teeth adjacent to the tooth fitted with the first coil piece or has further widened upper portion. Therefore, the second coil piece can easily be inserted into the slot without interference with other teeth. Moreover, the space in the slot can easily be filled and thus the space factor can be raised.

The embodiment of the present invention may be structured such that the slot has an upper portion which is narrower than the lower portion. The tooth adjacent to the tooth to which the first coil piece is fitted may have a tapered leading end. As a result, the coil pieces can be fitted easily.

The embodiment of the present invention may be structured such that the cross section of the first coil piece is formed as a trapezoidal shape, and the cross section of the second coil piece is formed as a parallelogram shape. As a result of the above-mentioned structure, the internal space of each slot having the widened lower portion can easily be filled with two types of coil pieces having simple shapes.

In the embodiment of the present invention, each coil piece is formed by alternately winding copper wires, each having a circular cross section, and pressing the wound copper wires. Thus, the space factor in the slot can be raised and therefore the performance of the dynamo-electric machine can be improved.

The embodiment of the present invention may be structured such that each coil piece is formed by winding a copper wire having a rectangular cross section. Each coil piece formed by winding the copper wire having the rectangular cross section may be formed by shifting the winding position or performing a pressing process after the winding process has been performed. As a result, the space factor in the slot can be raised compared with the wire having a circular cross section. The performance of the dynamo-electric machine thus can be improved.

DESCRIPTION OF THE PREFERRED EMBODIMENT

Figure 1:
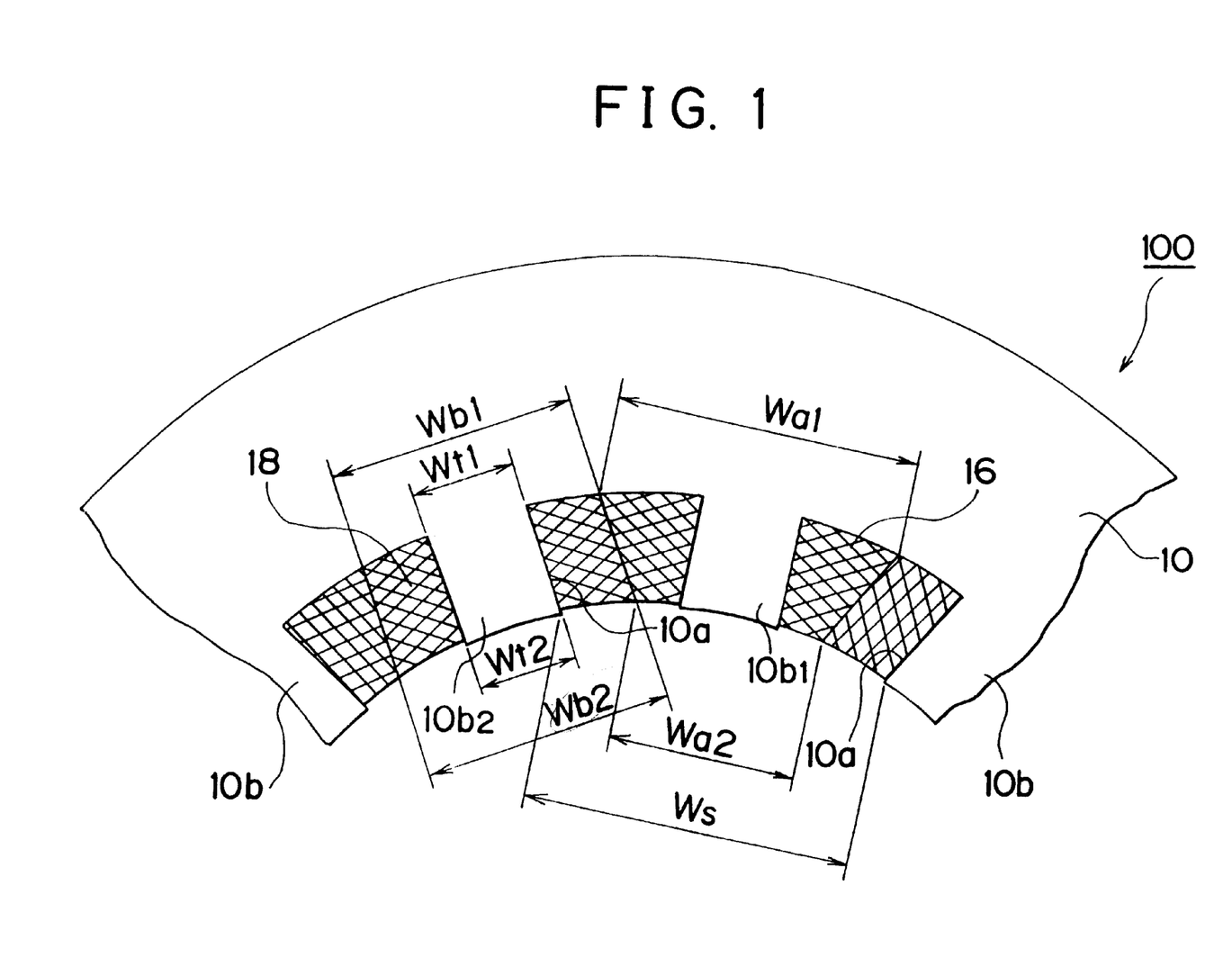
FIG. 1 is a partial view showing the structure of a stator of a dynamo-electric machine according to an embodiment of the present invention.

A preferred embodiment (hereinafter simply called an "embodiment") of the present invention will now be described with reference to the drawings. FIG. 1 is a partial drawing of a stator 100 of a dynamo-electric machine according to this embodiment. The stator 100 employs a stator core 10 which has a similar structure to that of the stator core 10 of the general dynamo-electric machine as shown in FIG. 7 and which is constituted by stacking a plurality of metal plates each having slots 10a and teeth 10b alternately formed along the inner periphery of the annular portion of the stator core 10.

This embodiment is characterized in that two differently shaped coil pieces are inserted into each of the slots so as to be efficiently fitted with the slots.

In this embodiment, first coil pieces 16 and second coil pieces 18 having cross sectional shapes satisfying the following conditions are employed. In case of the first coil pieces 16, a width Wa1 at the lower portion (that is, the bottom portion) of the parts of two adjacent slots 10a holding a first coil piece 16, and the interposed tooth 10b1, is equal to or smaller than the width Ws at the upper portion of the two slots 10a and the interposed the tooth 10b1 . Moreover, the sides of space in each slot 10a formed after fitting the first coil piece 16 extend parallel with the sides of the teeth 10b2 adjacent to the tooth 10b1 fitted with the first coil piece 16 or have a gradually widened upper portion. That is, the first coil piece 16 satisfies the relationship Wa1≦Ws.

On the other hand, the second coil piece 18 is fitted adjacent the tooth 10b2, adjacent to the tooth 10b1 with which the first coil piece 16 has been fitted. The second coil piece 18 is inserted into an empty space in the slot 10a after the first coil piece 16 has been inserted, so that the foregoing empty space is filled with the second coil piece 18. The space in the slot 10a formed after fitting the first coil piece 16 has sides extending parallel with the sides of the teeth 10b2 or has a gradually widened upper portion. Therefore, the relationship between the width Wb1 of the second coil piece 18 at the lower portion of the slot 10a (and the intervening tooth 10b2), and the width Wb2 of the same at the upper portion of the slot 10a satisfies Wb1≦Wb2. The end of the first coil piece 16 adjacent the upper portion of the two adjacent slots is substantially flat in the direction along the inner periphery of the annular stator core. This means that, as evident from the figures, the first coil piece is not triangular in section, but instead has a flat or slightly curved end surface.

That is, the first coil piece 16 can be inserted into a predetermined slot without any interference with the teeth closely disposed at both sides of the tooth 10b1 with which the first coil piece 16 is fitted. Moreover, the empty space in the slot 10a which is formed after the first coil piece 16 has been inserted has sides extending parallel with the sides of the tooth 10b2 with which the second coil piece 18 is fitted or has the gradually widened upper portion. Therefore, the second coil piece 18 having the shape with which the above-mentioned empty space is filled can be inserted without any interference with another member.

Figure 2:
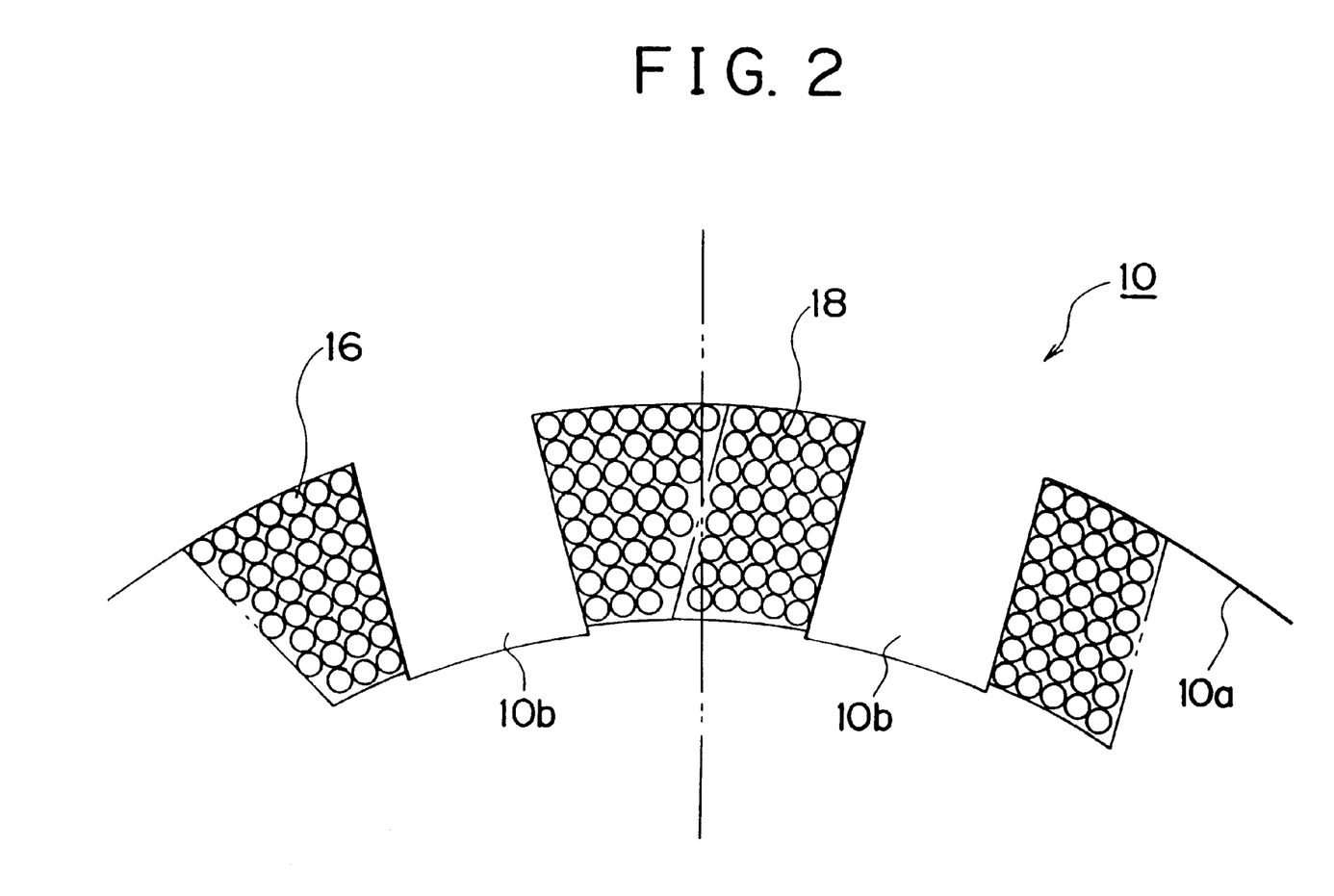
FIG. 2 is a diagram showing the shape of a coil piece used in the stator of the dynamo-electric machine according to the embodiment of the present invention.

The embodiment shown in FIG. 1 has a structure that the first coil piece 16 has a trapezoidal shape and the second coil piece 18 has parallelogram shape. In this case, each coil piece is molded by a coiling machine using a mold or the like. When the number of winding times is increased/decreased arbitrarily as shown in FIG. 2, the coil pieces each having the trapezoidal shape or the parallelogram shape can easily be produced. Since the coil pieces having the trapezoidal shape can be easily distinguished from those having the parallelogram shape, there is no apprehension that confusion between the two types of coil pieces takes place when inserting and fitting both types of the coil pieces with the stator core 10. Therefore, workability in the assembling process can be improved. It is preferable that the cross sectional area of the first coil piece 16 is equal to that of the second coil piece 18. By equalizing the two cross sectional areas, the amount of a rotating field which is generated by the first coil piece 16 is equalized to that generated by the second coil piece 18. As a result, the dynamo-electric machine can be operated under stable conditions.

Figure 3:
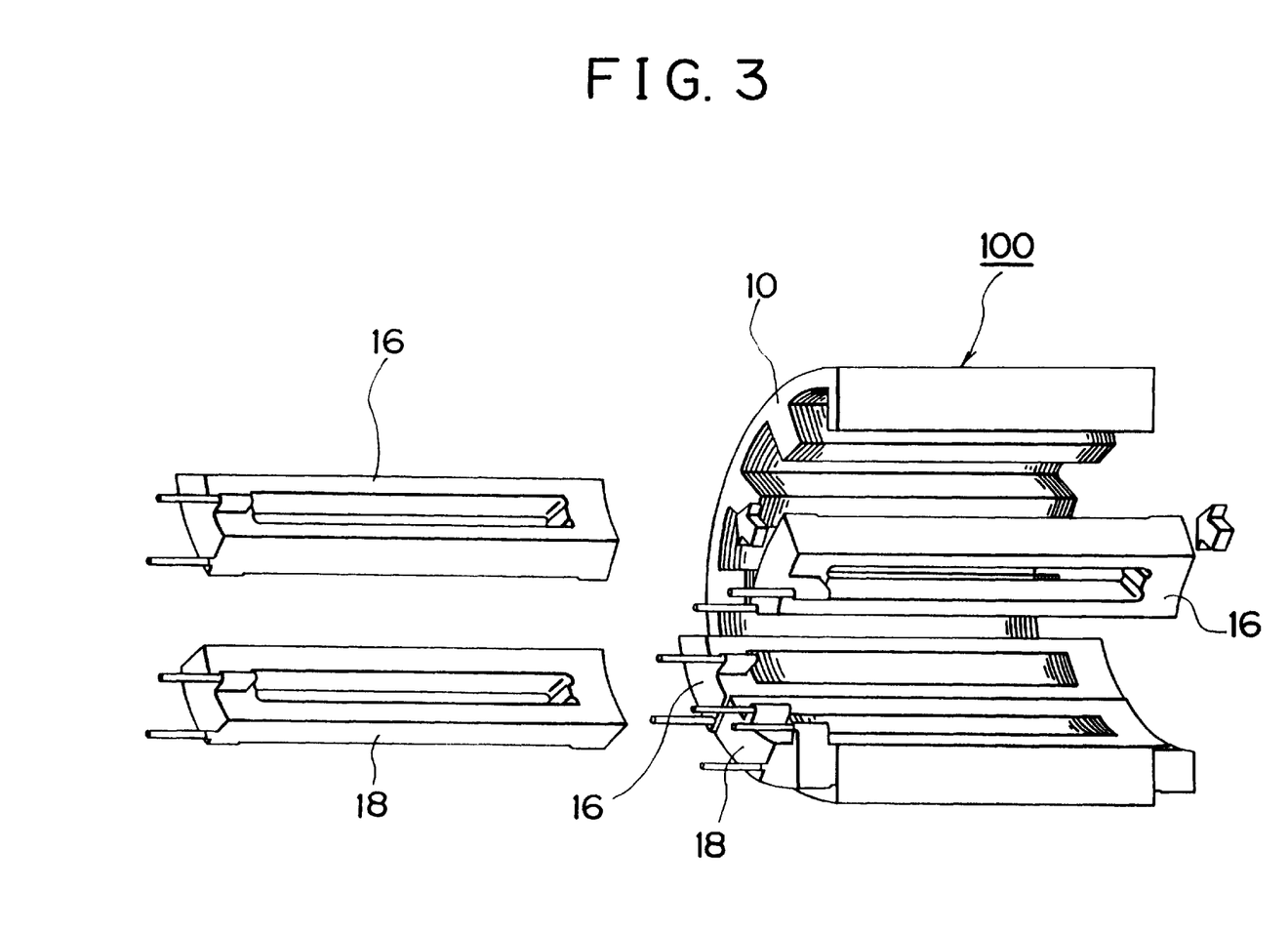
FIG. 3 is a partially-broken perspective view showing the structure of the stator of the dynamo-electric machine according to the embodiment of the present invention.

FIG. 3 is a perspective view showing a state where a portion of the stator core 10 is broken away so as to illustrate how the first coil piece 16 and the second coil piece 18 are inserted. When the first coil piece 16 and the second coil piece 18 are inserted and fitted with the stator core 10, the first coil piece 16 is fitted with a tooth 10b. As can be understood from FIG. 1, the empty space in the slot 10a formed after the first coil piece 16 has been fitted has sides extending parallel with the sides of the teeth 10b with which the coil piece is not fitted. Therefore, the second coil piece 18 can be inserted without any interference with the other tooth 10b or the first coil piece 16 that has been already inserted. The width Wt2 (adjacent to the open portion of the slot 10a) of the tooth 10b can be slightly tapered to be smaller than the width Wt1 (adjacent to the bottom portion of the slot 10a) at the root portion. As a result, the coil piece can even more easily be inserted into the teeth 10b. That is, the teeth 10b is able to satisfy the relationship $Wt1 \geqq Wt2$.

Figure 4A:
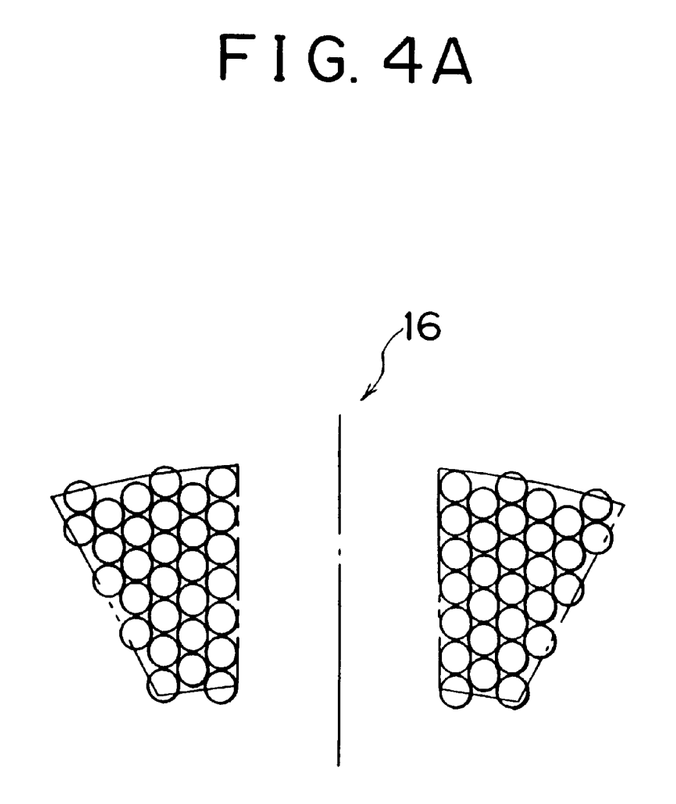
FIGS. 4A and 4B are a diagram showing a method of manufacturing a coil piece made of a wire having a circular cross section used in the stator of the dynamo-electric machine according to the embodiment of the present invention.
Figure 4B:
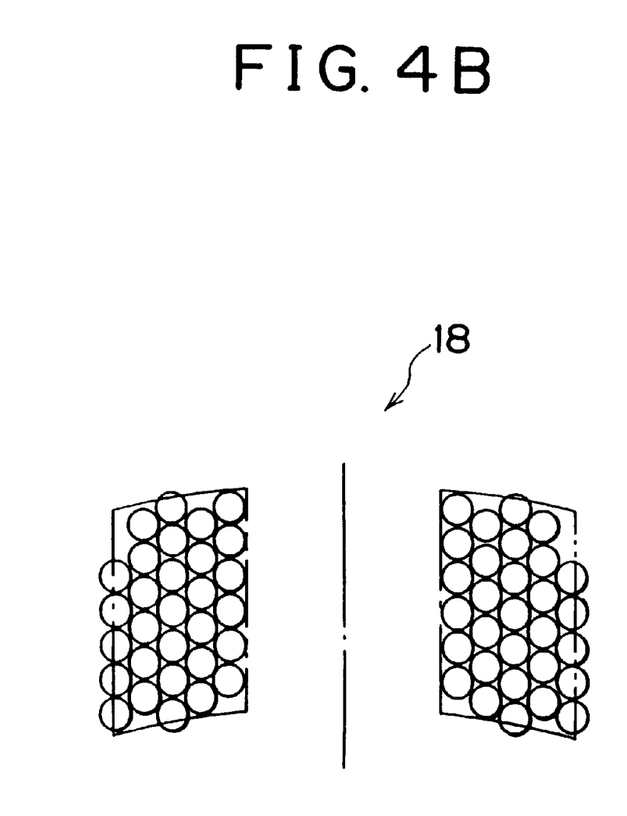

When the coil piece as shown in FIG. 2 is produced, a copper wire having a circular cross section (a round wire) is generally employed. When the coil piece is molded into the trapezoidal shape or the parallelogram shape as described above, a gap is inevitably formed between the round wires or between the round wire and the inner wall surface of the slot. There is apprehension that a required space factor cannot be obtained owing to such gap. Therefore, the coil piece is formed such that the round wires are alternately disposed and the round wires are projected by a degree corresponding to a gap expected to be formed, as shown in FIGS. 4a and 4b. Then, a pressing mold is operated to press the projected round wires to form the coil piece having an ideal cross sectional shape. Thus, the coil piece is molded to have an ideal cross sectional shape so as to realize a required space factor. When the coil piece is produced by the press molding process, the process must be performed such that the material of the round wire cannot be decomposed and the enamel with which the round wire is coated does not broken.

Figure 5A:
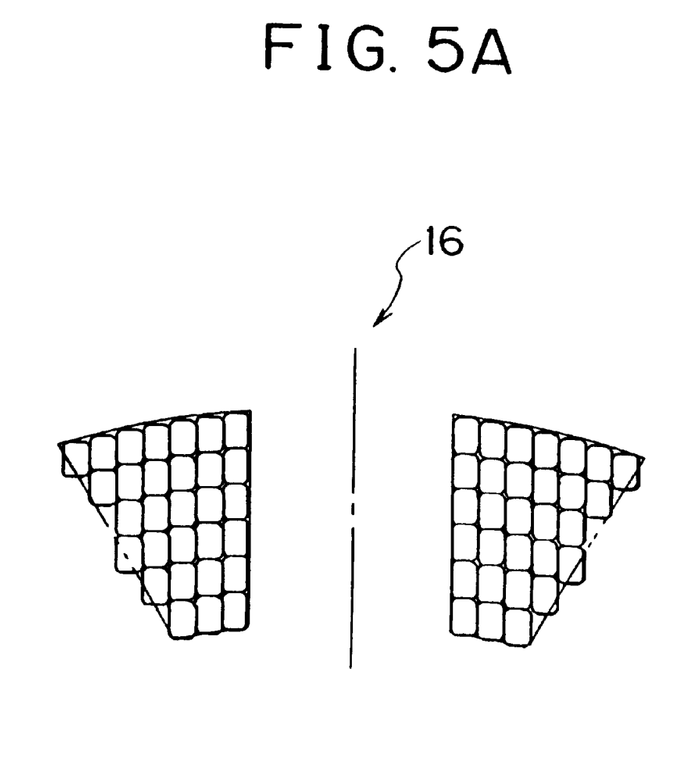
FIGS. 5A and 5B are a diagram showing a method of manufacturing a coil piece made of a wire having a rectangular cross section used in the stator of the dynamo-electric machine according to the embodiment of the present invention.
Figure 5B:
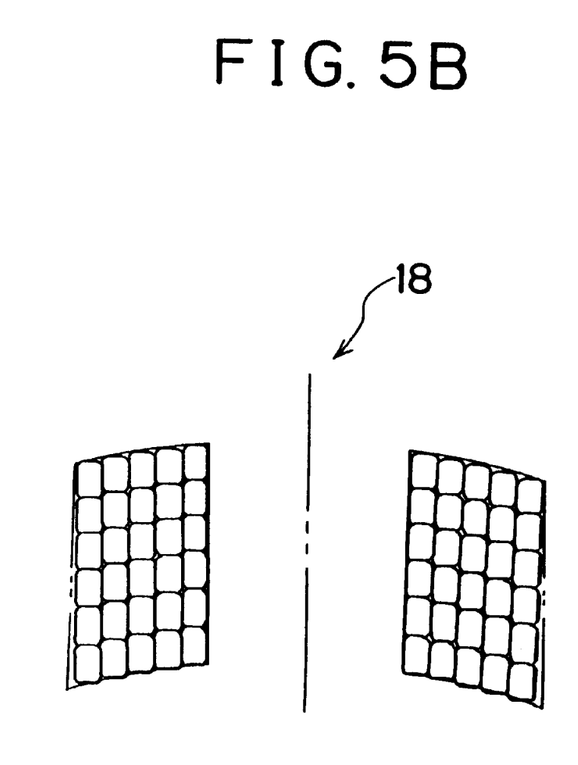

When a copper wire having a rectangular cross section (a rectangular wire) is used to form the coil piece as shown in FIGS. 5a and 5b, the space factor can be further raised. Since the rectangular wire has straight sides, fitting between the rectangular wires, and fitting between the molded coil piece and the inner wall surface of the slot can be improved compared with that realized by round wires. By shifting winding positions sequentially, the ideal shape, such as the above-mentioned trapezoidal and parallelogram shapes, can be realized as close as possible. The oblique lines of the trapezoidal shape can be formed by arbitrarily increasing/decreasing the number of winding times in the similar manner to the case employed with round wire. By selecting the longitudinal and horizontal dimensions of the rectangular wire arbitrarily, a shape closer to an ideal cross sectional shape can easily be realized.

Figure 6A:
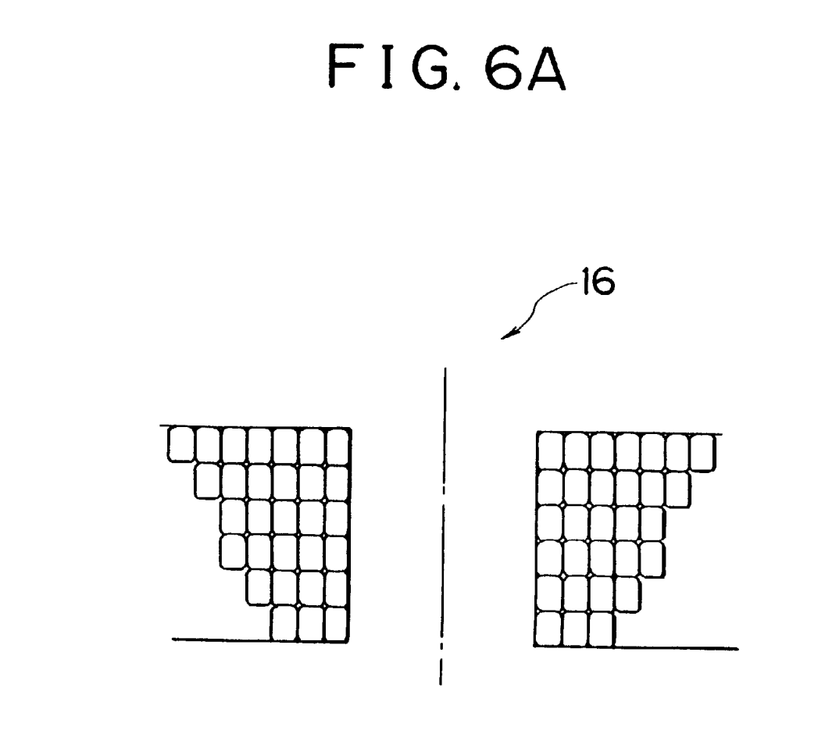
FIGS. 6A and 6B are a diagram showing another method of manufacturing a coil piece made of a wire having a rectangular cross section used in the stator of the dynamo-electric machine according to the embodiment of the present invention.
Figure 6B:
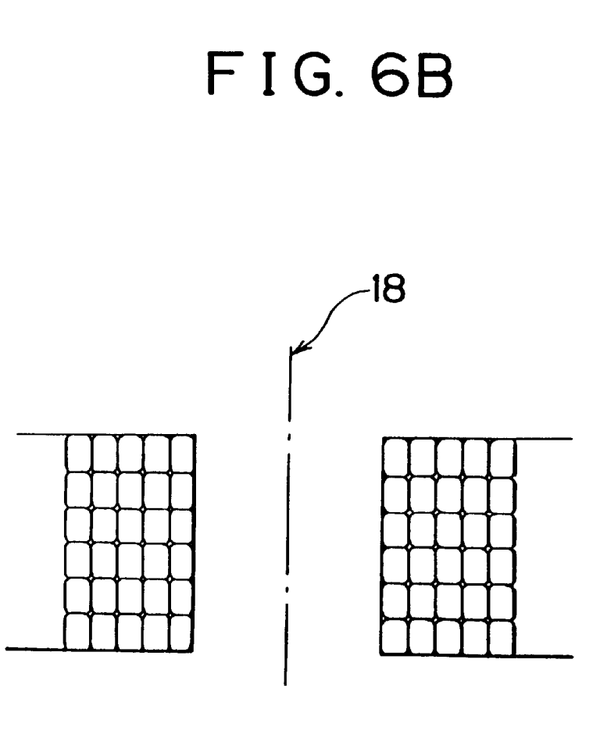

The operation for slightly shifting the winding position of the rectangular wire for producing the coil piece takes a long time and is likely to cause the winding position to be unstable. Therefore as shown in FIGS. 6a and 6b, the first winding operation is performed by normal winding such that the rectangular wire is not shifted. Then, the rectangular wires are loaded into a mold having the required trapezoidal shape or the parallelogram shape, followed by pressing the rectangular wires so as to correct the shape to be faithfully molded. Since the surfaces of the rectangular wires are in contact with each other, the correction can easily be performed. Therefore, the process for producing the coil pieces can be simplified.

When the coil wire is previously wound plural times to produce the coil piece as described above, the required shape of the coil piece must be maintained until the coil pieces are inserted into the slots 10a. In this case, it is preferable that a resin material, such as a thermosetting resin adhesive, is used to harden the coil pieces immediately after completing the process for winding the coil pieces. The resin material may be injected after molding the coil pieces so as to be hardened, or a resin previously applied to the surface of each coil wire may be melted and hardened again. The applied resin can easily be melted within a short period by passing an electric current through the coil wire. Also the process for hardening the resin again can easily be performed by air blowing or the like after disconnecting the supply of the electric current to the coil wire.

Although the first coil piece 16 has the trapezoidal shape and the second coil piece 18 has the parallelogram shape in this embodiment, any shapes can be used as far as the above-mentioned conditions for the shapes thereof are satisfied. For example, a first coil piece having a widened width at the bottom portion of the slot and a second coil piece having a widened width at the open portion of the slot may be employed to obtain a similar effect. If the boundary surface on which the first coil piece and the second coil piece contact with each other is formed into a curved surface, a similar effect can also be obtained.

According to the present invention, the empty space in the slot formed after the first coil piece has been inserted has sides extending parallel with the sides of the teeth adjacent to the tooth with which the first coil piece is fitted or has the gradually widened upper portion. Therefore, the second coil piece can easily be inserted into the slot without interference with another member. Moreover, the space in the slot can easily be filled and thus the space factor can be raised.

The invention claimed is:

1. A stator of a dynamo-electric machine comprising:
    an annular stator core having a plurality of slots and teeth alternately formed along the inner periphery thereof; and
    a plurality of coil pieces, each of which is insertable around one of the teeth and into two adjacent slots separated by said one of the teeth,
    wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, wherein the first coil piece has an end adjacent the upper portion of the two adjacent slots, which end is substantially flat in the direction along the inner periphery of the annular stator core, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and
    wherein the coil pieces include second coil pieces, each of which is fitted into the space between the side of the first coil piece and the adjacent tooth, said first and second coil pieces having substantially equal cross sectional areas.

2. The stator of a dynamo-electric machine according to claim 1, wherein the upper portion of each slot is narrower than the lower portion thereof.

3. The stator of a dynamo-electric machine according to claim 1, wherein the adjacent tooth has a leading end whose width is gradually reduced in a direction toward the upper portion of the slot.

4. The stator of a dynamo-electric machine according to claim 1, wherein the first coil piece has a trapezoidal cross section, and the second coil piece has a parallelogram cross section.

5. The stator of a dynamo-electric machine according to claim 1, wherein each said coil piece is formed by alternately wound and pressed round copper wires.

6. The stator of a dynamo-electric machine according to claim 1, wherein each said coil piece is formed by wound copper wires having a rectangular cross section.

7. The stator of a dynamo-electric machine according to claim 6, wherein each said coil piece is formed by wound and positionally shifted copper wires having rectangular cross sections.

8. The stator of a dynamo-electric machine according to claim 6, wherein each said coil piece is formed by wound and pressed copper wires, each having a rectangular cross section.

9. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, wherein the first coil piece has an end adjacent the upper portion of the two adjacent slots, which end is substantially flat in the direction along the inner periphery of the annular stator core, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces include second coil pieces, each of which is fitted into the space between the side of the first coil piece and the adjacent tooth, said first and second coil pieces having equal cross sectional areas.

10. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, wherein the first coil piece has an end adjacent the upper portion of the two adjacent slots, which end is substantially flat in the direction along the inner periphery of the annular stator core, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces include second coil pieces, each of which is fitted into the space between the side of the first coil piece and the adjacent tooth, said first and second coil pieces having cross sectional areas selected such that an amount of a rotating field generated by said first coil pieces is about equal to an amount of a rotating field generated by said second coil pieces.

11. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces further include second coil pieces, each of which second coil pieces is fitted into the space between the side of the first coil piece and the adjacent tooth, each said second coil piece having a width at the lower portion of the two adjacent slots which is smaller than the width of the first coil piece at the lower portion of the two adjacent slots, said first and second coil pieces having substantially equal cross sectional areas.

12. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces further include second coil pieces, each of which second coil pieces is fitted into the space between the side of the first coil piece and the adjacent tooth, each said second coil piece having a width at the lower portion of the two adjacent slots which is smaller than the width of the first coil piece at the lower portion of the two adjacent slots, said first and second coil pieces having equal cross sectional areas.

13. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces further include second coil pieces, each of which second coil pieces is fitted into the space between the side of the first coil piece and the adjacent tooth, each said second coil piece having a width at the lower portion of the two adjacent slots which is smaller than the width of the first coil piece at the lower portion of the two adjacent slots, said first and second coil pieces having cross sectional areas selected such that an amount of a rotating field generated by said first coil pieces is about equal to an amount of a rotating field generated by said second coil pieces.

14. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, wherein the first coil piece has an end adjacent the upper portion of the two adjacent slots, which end is formed by a plurality of wires in the direction along the inner periphery of the annular stator core, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces include second coil pieces, each of which is fitted into the space between the side of the first coil piece and the adjacent tooth, said first and second coil pieces having substantially equal cross sectional areas.

15. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, wherein the first coil piece has an end adjacent the upper portion of the two adjacent slots, which end is formed by a plurality of wires in the direction along the inner periphery of the annular stator core, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces include second coil pieces, each of which is fitted into the space between the side of the first coil piece and the adjacent tooth, said first and second coil pieces having equal cross sectional areas.

16. A stator of a dynamo-electric machine comprising:

an annular stator core having a plurality of slots and teeth alternately formed along the inner periphery thereof; and a plurality of coil pieces, each of which is insertable around one of the teeth and into two adjacent slots separated by said one of the teeth, wherein the coil pieces include first coil pieces, each of said first coil pieces having a cross sectional shape such that when the first coil piece is inserted around said one of the teeth, the first coil piece has a width at a lower portion of the two adjacent slots which is equal to or smaller than a width of an upper portion of the two adjacent slots, wherein the first coil piece has an end adjacent the upper portion of the two adjacent slots, which end is formed by a plurality of wires in the direction along the inner periphery of the annular stator core, and wherein a side of the first coil piece facing a tooth adjacent to said one of the teeth extends substantially parallel to a side of the adjacent tooth or such that a space between said side of the first coil piece and the adjacent tooth gradually increases in a direction toward the upper portion of the slot, and wherein the coil pieces include second coil pieces, each of which is fitted into the space between the side of the first coil piece and the adjacent tooth, said first and second coil pieces having cross sectional areas selected such that an amount of a rotating field generated by said first coil pieces is about equal to an amount of a rotating field generated by said second coil pieces.

\* \* \* \* \*

UNITED STATES PATENT AND TRADEMARK OFFICE
CERTIFICATE OF CORRECTION

PATENT NO. : 6,218,758 B1
DATED : April 17, 2001
INVENTOR(S) : Miura et al.

It is certified that error appears in the above-identified patent and that said Letters Patent is hereby corrected as shown below:

<u>Title page,</u>
Item [75], the 2<sup>nd</sup> Inventor's name is misspelled. Item [75] should read as follows:

[75] Inventors: Tetsuya Miura; Yasutomo Kawabata; Ryoji Mizutani; Tetsuya Sugimoto, all of Aichi-ken (JP)

Signed and Sealed this

Sixth Day of November, 2001

Attest:

*Nicholas P. Godici*

Attesting Officer

NICHOLAS P. GODICI
*Acting Director of the United States Patent and Trademark Office*